March 21, 1950 T. H. WHALEY, JR 2,501,114
FRACTIONATION APPARATUS
Filed Feb. 27, 1947 2 Sheets-Sheet 1
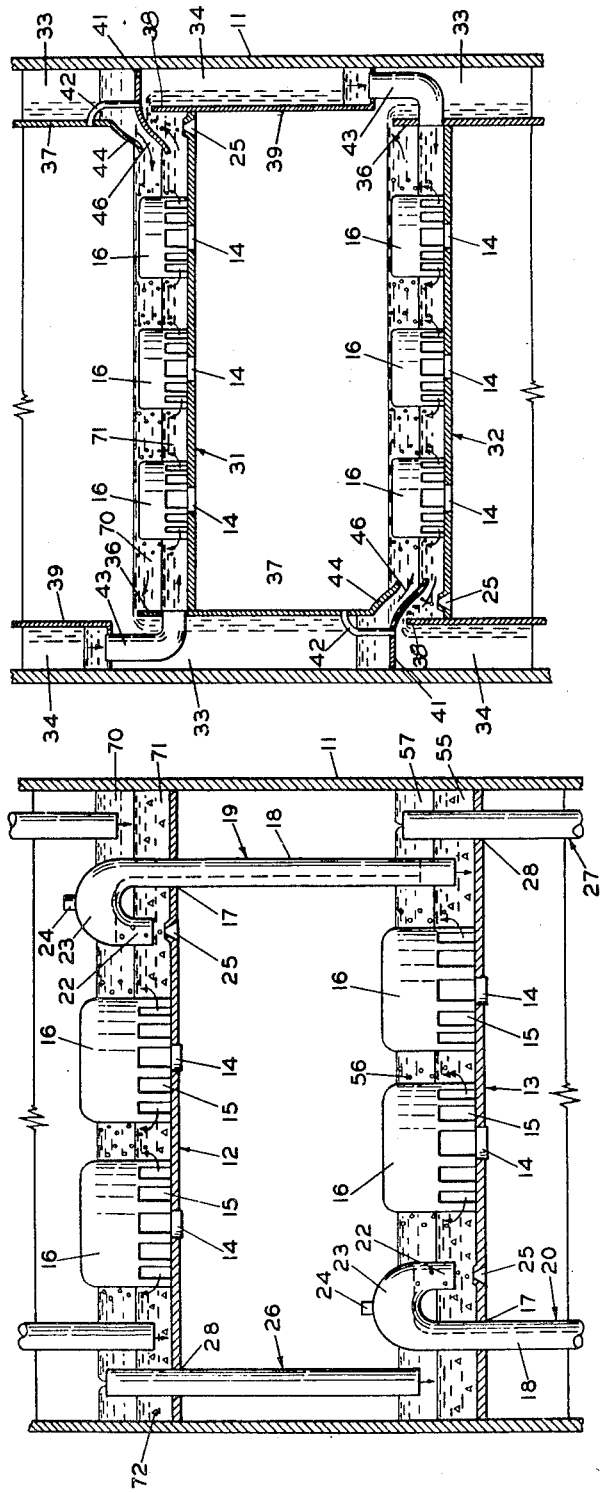
INVENTOR.
T. H. WHALEY, JR.
BY Hudson & Young
ATTORNEYS March 21, 1950     T. H. WHALEY, JR     2,501,114
FRACTIONATION APPARATUS Filed Feb. 27, 1947     2 Sheets-Sheet 2

INVENTOR.
T. H. WHALEY, JR.
BY Hudson & Young
ATTORNEYS

Patented Mar. 21, 1950

2,501,114

UNITED STATES PATENT OFFICE 2,501,114

FRACTIONATION APPARATUS

Thomas H. Whaley, Jr., Bartlesville, Okla., assignor to Phillips Petroleum Company, a corporation of Delaware Application February 27, 1947, Serial No. 731,270

6 Claims. (Cl. 261—18)

This invention relates to bubble plate columns of the type used for selective absorption and fractional distillation. In one of its more specific aspects it relates to improved downtakes or apparatus for transferring liquid from a higher lever to a lower level in a bubble tower. This invention also relates to a method of operation of a bubble plate column wherein more than one liquid phase is present. The invention further relates to apparatus for handling a plurality of liquid phases in a bubble plate column of the type used for selective absorption and fractional distillation.

This application is a continuation-in-part of my copending application, Serial No. 557,911, filed October 9, 1944, and issued March 4, 1947, as U. S. Patent No. 2,416,724.

In the conventional bubble-cap type fractionation or absorption column a cylindrical tower is divided into compartments by a series of trays spaced one above the other along the length of the cylinder. Each plate is provided with bubble caps or suitable openings by reason of which vapor from the compartment below the plate is made to bubble through liquid on the plate and hence brought into intimate contact with the liquid. Each plate is provided with a weir or overflow for the liquid and with downpipes or downtakes which conduct the overflow liquid to the plate below. The vapor passing up the tower is brought into intimate contact at each plate with liquid which flows from plate to plate down the tower.

In the separation and purification of polymerizable organic monomers, for example, butadiene, solid and semisolid materials formed by oxidation, polymerization, or both have caused serious operating difficulties. As a specific example, often in the fractionation of butadiene, the fractionating column has been so obstructed by accumulation of a granular white solid that the system had to be shut down and the equipment cleaned out. While it is most desirable to prevent the formation of these troublesome compounds, their occurrence may be expected even when inhibitors are used to prevent their formation. The present invention provides a bubble tower which will successfully handle a granular, flocculent, or other nonadhesive solid in the form of a slurry having fluid characteristics.

In some instances it is desirable to contact a plurality of liquid phases with a vapor or gaseous phase. For example, in the steam distillation of furfural in the butadiene absorption process for removal of dimers or liquid polymers, a water phase and a furfural and/or polymer phase may be present. This mixture cannot ordinarily be handled in a bubble plate column since the heavier phase, furfural, will stand on the plate to the overflow lever and the lighter liquid phase will be spread in a thin layer on top of the heavier phase or dispersed as globules through the heavier phase. In either condition efficient intimate countercurrent contact between vapor and the lighter liquid is not accomplished. The present invention provides a bubble plate column which will successfully handle two liquid phases.

The present invention is also useful in the separation of a mixture of materials, for example, close boiling hydrocarbons, by selective absorption or extractive distillation. In some instances it is desirable to use as an aid in separation a liquid which is not miscible with the hydrocarbon or other liquid to be purified. Such a material may be either an azeotrope forming agent or a selective absorbent for at least one of the components of the mixture. It is also possible to use with the method and apparatus of this invention more than one agent which aids in effecting a separation of a mixture into its components or various fractions. For example, a combination of azeotrope forming and solvent extracting materials may be employed simultaneously. In such an instance it is desirable that the two agents used be immiscible. The invention may also be used in solvent extraction processes wherein one or more solvents are employed. Other uses for the process and apparatus of my invention will be apparent to those skilled in the art.

An object of this invention is to provide an improved bubble plate column for countercurrent contact of vapors and liquids.

Another object is to provide improved downtakes for bubble plate columns.

Still another object is to provide an improved bubble plate column which will handle non-adhesive solids.

A further object is to provide a bubble plate column which will handle a plurality of liquid phases.

A still further object is to provide a bubble plate column which will handle both non-adhesive solids and a plurality of liquid phases.

A still further object is to provide a bubble plate column in which the relative amounts of two or more liquid phases on the bubble plate may be controlled.

It is also an object of this invention to provide an improved method of operation of bubble plate columns.

Other objects and advantages will be apparent to those skilled in the art from the following detailed description of the invention and from the accompanying figures and claims.

I accomplish these and other objects by the design and arrangement of elements of a bubble cap column wherein two liquid phases to be contacted with one another and at the same time contacted with a vapor phase are flowed across a bubble cap tray in opposite directions, that is, countercurrently. I accordingly herein describe apparatus parts and their arrangement and operation for the countercurrent contacting of two liquid phases on a bubble cap tray while both liquid phases are being stripped by vapors passing upward through the tower. Solids may or may not be suspended in one or both of the liquid phases.

Figure 1 is an elevational cross sectional view through a portion of a bubble tower embodying the present invention, showing two trays, the upper and lower portions of said tower being broken away to avoid repetition of similar parts.

Figure 2 is a view similar to Figure 1 showing a modified embodiment of apparatus of my invention.

Figure 3:
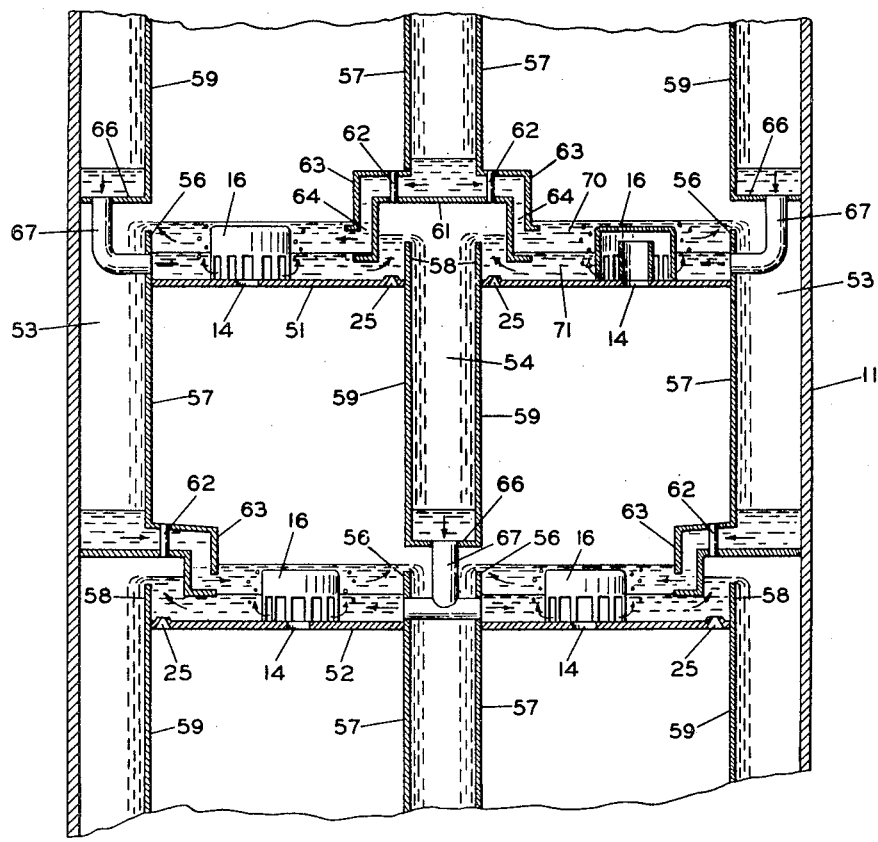
Figure 3 illustrates still another embodiment of the apparatus of my invention.

In Figure 1 a bubble column is shown comprising a vertical shell 11 which is suitably cylindrical in shape but which may be of any desired cross section. Vertically spaced inside shell 11 is a series of substantially horizontally dispersed bubble trays 12 and 13; normally a number of similar trays are spaced above and below those shown in the drawing. While trays 12 and 13 are identical, it is desired for reference purposes to give them separate numbers. The top and bottom of the column are closed and provided with suitable outlets and inlets for products, reflux, feed, stripping medium, etc., as required for the particular operation carried out. Since the general construction and operation of bubble plate columns is well known to those skilled in the art of fractional separations and similar processes, it is not deemed necessary to go into these features in detail.

Plates or trays 12 and 13 are provided with a series of perforations 14. While the invention may be applied to bubble plate columns of the perforated plate type and various other arrangements known in this art, preferably the perforations 14 are associated with more or less conventional bubble-caps common in the art of bubble columns. As the operation of bubble caps 16 is well known in the art, no further explanation is deemed necessary. The bubble caps 16 are provided with slots 15 through which vapor passes from the vapor space below the tray through the liquid to the vapor space above the tray.

Trays 12 and 13 are provided with perforations 17 and into perforations 17 are inserted the long leg 18 of inverted J tubes generally designated as 19 and 20, respectively. While a close fit is sufficient it is preferable to seal tray 12 to tube 19 and tray 13 to tube 21, by such methods as welding around the line of contact between the tray and the tube (the welding not being shown). There may be any number of trays similar to trays 12 and 13 above and below these trays in the tower, all the trays being identical except for the bottom and top of the tower as set forth above. Conventional downtake pipes 26 and 27 are also provided for each tray. These pipes extend through perforations 28 in the trays and are attached in conventional manner. The downtake pipes are spaced some distance from the J tubes, preferably on opposite sides of the trays.

Each J tube has a short leg 22 and a bend 23 connecting the long and short legs. The short leg 22 extends down adjacent the top of the plate upon which the J tube is mounted. A perforation 24 is provided in the top of J tubes 19 and 20. In order to agitate and force any solid granular material up into 22 and over bend 23 a vapor jet 25 may be provided as illustrated on tray 12, the vapor rising into 22 and passing on out perforation 24. The perforation 24 relieves the excess vapors added by vapor jet 25 and prevents syphoning by the J tube.

In Figure 2 is shown a modified embodiment of the invention in which the same type shell 11 is provided with a series of vertically spaced substantially horizontal bubble trays generally designated as 31 and 32. These trays extend across said shell 11 and are sealed to said shell. As in Figure 1 the upper and lower terminus of the column being conventional is not shown. Each tray is provided with perforations 14. These perforations are again provided to be operatively connected to conventional bubble caps 16 as in Figure 1 for the conventional purposes of the prior art.

The end of trays 31 and 32 have perforations 33 and 34 adjacent opposite sides of shell 11, or trays 31 and 32 may be regarded as stopping short of the wall of 11 providing spaces 33 and 34.

Each tray is provided with a pair of segmental type downtakes on opposite sides of the tray defining the passageways 33 and 34. The passageway 33 is between the shell 11 on one side and the downtake which is made up of an overflow weir 36 and a depending skirt 37. On the opposite side of the tray the downcomer comprises overflow weir 38 and a depending skirt 39. The bubble caps 16 are located between weirs 36 and 38. Weir 36 is somewhat higher than weir 38 and serves to control the liquid level on the tray. Extending over weir 38 is a shield 41 which is projected downward on the bubble cap side of the weir to a point somewhat below the level of the top of weir 38 but above tray 31. A pipe 42 establishes communication between the underside of shield 41 above the level of weir 38 and the vapor space above bubble caps 16 through skirt 37. Weir 38, skirt 39, shield 41, and vent pipe 42 thus arranged relative to the plate and the shell of the column make up a large capacity downcomer equivalent to the J tube of Figure 1. The bottom of the passageway 34 is closed and is provided with some conduits 43 preferably in the form of pipes which extend through overflow weir 36 adjacent the top of the tray. Attached to skirt 37 is a seal 44 which extends below the level of overflow weir 36. Seal 44 and shield 41 define an outlet 46 from passageway 33 on to the plate below. The purpose of conduit 42 is to prevent syphoning of liquid from the tray through passageway 34. In some instances conduit 42 may be eliminated without affecting operation of the downtake. The seal 44 may be made an integral part of skirt 37. By extending below the top of weir 36 the lowermost portion of seal 44 is extended into liquid on the tray and thus provides a liquid seal preventing vapors from ascending through passageway 33. Seal 44 need not necessarily be a separate and distinct shape; the seal may be provided by extending skirt 37 itself below the level of weir 36. Obviously certain parts, for example, 36, 37 and 44 may be made integral or in parts separable in different manners, all of which division into parts is immaterial to the practice of the invention as long as these parts are secured together to form a unitary structure at the time the column is in operation.

In Figure 3 the same type of vertical shell 11 is used with a modified arrangement of internal plates and downcomers particularly adapted to large diameter fractionating columns of high capacity. Extending across and secured to shell 11 is a series of bubble cap trays generally designated by the numerals 51 and 52. As explained above in connection with Figures 1 and 2 any number of trays may be employed and the general construction of the shell 11 is conventional and is not illustrated in the drawing. As with the foregoing, trays 51 and 52 are provided with perforations 14 to which conventional bubble caps 16 are connected, which bubble caps operate in a conventional manner. In the tray 51 are openings which provide for passageways or downcomers 53, 54 to the tray 52 below. The passageways 53 are adjacent shell 11 and may be either at opposite sides of the column or extend completely around the column as will be apparent to those skilled in the art.

Both the divided tray and the ring and doughnut type tray, each of which employ a combination of center and peripheral downcomers, are known in the distillation or rectification art. Passageway 53 is defined by shell 11, overflow weir 56, and skirt 57. The height of weir 56 determines the level of liquid on the tray. Passageway 54 is defined by weirs 58 and depending skirts 59. Weirs 58 are somewhat lower than weirs 56, the purpose of which will be apparent from the description of the operation of the invention. A shield or cap 61 extends over passageway 54 and down on the outside of bubble cap side of weirs 58 to a point between the level of weir 58 and the tray 51. Vent pipes 62 establish communication between the vapor space above caps 16 and the interior of the downtake or passageway 54. The combination of weirs 58, skirts 59, shield 61, and vent pipes 62 are the equivalent in function of J tubes 19 and 20 of Figure 1. Attached to skirt 57 is a seal 63 which extends below the level of the overflow weir 56. This provides a liquid seal at the bottom of the downcomer to prevent the escape of vapor from one tray to another through the downcomer. The seal 63 and shield 61 form a passageway 64 for liquid from the downcomer. The lower ends of skirts 59 are closed by a tube sheet 66 to which are attached conduits, preferably in the form of pipes 67 which extend through overflow weirs 56 adjacent the tops of the trays.

On tray 52 the general construction of the various parts making up the improved downcomers of my invention are the same as those of tray 51. The order or arrangement of downcomers is, however, reversed, the downcomer which performs the function of the J tube now being placed on the outside of periphery of the tray and the more or less conventional downcomer being placed on the inside. The parts have been designated with the same reference numerals despite change in location to avoid confusion.

The operation of the apparatus of Figure 1 is as follows: The vapors pass upwardly from space to space through bubble caps 16 and the two immiscible liquids 70 and 71 flow downwardly from tray to tray through the combination of downcomers provided by the apparatus of my invention. Assuming that granular non-adhesive particles 72 are present in the column these particles are not allowed to accumulate on the trays but are carried from one tray to the next and so on to the bottom of the column through the J tube downcomers 19 and 20. The bubble caps 16 tend to prevent accumulation near the center of the tray due to the agitation of the vapor flow through the slots in the bubble caps. These particles are carried along near the upper surface of the tray until they reach a point in the immediate vicinity of the short leg 22 of the J tube. The particles are then drawn into the short leg of the J tube with the heavier liquid 71 and carried to the tray below where the process is repeated. A vapor jet 25, forming a part of my invention, may be provided immediately below the open end of the short leg 22 of the J tube. This jet opening 25 permits vapor from the space below tray 12 to bubble through the liquid 71 into the bend of the J tube 23 from which it is vented through outlet 24 to the vapor space of the tray above. This provides agitation and gives a gas lift effect which aids in carrying the suspended particles 72 over into the long leg of the J tube for transfer to the tray below. Thus any granular material which may be present is carried down the column and is not permitted to accumulate on the trays in sufficiently quantity to interfere with successful operation of the column. The lighter liquid 70 overflows the downcomer pipe 26 which is designed to maintain the proper liquid level on the tray. The lower end of the downtake pipe preferably extends below the top of the liquid on the tray below to provide a liquid seal. In operation the heavier liquid 71 flows across the tray in one direction while the lighter liquid 70 flows across the tray in the opposite direction or countercurrent to the flow of the heavier liquid. Each liquid is handled by its own set of downcomers. The lighter liquid is transferred from tray to tray by means of the conventional type downcomers 26 while the heavier liquid is transferred from tray to tray by means of the J tube downcomers. The level of the interface between the two liquids or the depth of the heavier liquid 71 is determined by the relative densities of the liquids; the volumes handled by the apparatus, and the design of the J tube. It will be evident that the level may be predetermined for given liquids and the apparatus designed accordingly.

The operation of the apparatus illustrated in Figure 2 is similar to that of Figure 1. The lighter liquid 70 flows down the column from tray to tray through the more or less conventional downcomers at 33. The heavier liquid 71 flows down the column through the downcomers of my invention and is transferred from tray to tray by flow through passageways 34 and pipes 43. As in the apparatus illustrated in Figure 1 the heavy and light liquids flow countercurrent to one another across the tray. This countercurrent flow provides an improved contact between the vapors from bubble caps 16 and the liquids on the tray. Preferably, though not necessarily, the openings in the bubble caps are below the interface between the two liquids. The lowermost portion of the shield 41 is disposed below the interface level. This prevents entrance of the lighter liquid 70 into the passageway 34. The vent tube 42 prevents syphoning. Seal 44 on the lower edge of the skirt 37 of the conventional type downcomer extends below the level of the lighter liquid and passageway 46 but the seal 44 and the shield 41 are preferably arranged in a manner similar to that illustrated in the figure to prevent agitation and mixing of the lighter and heavier liquids at the inlet to the downcomer 34. The pipes 43 at the lower end of passageway 34 carry the heavier liquid on to the tray at a level below the top of weir 36 to substantially prevent overflow of any of the heavier material at this point.

The operation of the apparatus of Figure 3 is substantially the same as that of Figure 2 and needs very little additional explanation. Pipes 67 are provided at the lower end of the downcomers for the heavier liquid permitting the heavier liquid to flow on to the tray without substantial carry over with the lighter liquid over weirs 56. The seal 63 at the lower end of the downcomer for the lighter liquid and the shield or cap 61 form a passageway 64 which permits the lighter liquid to flow on to the tray without substantial agitation, mixing the consequent carry over with the heavier liquid. The flow of the lighter and heavier liquids across the trays is countercurrent to one another. The lighter liquid flows on to tray 51 at the center of the tray, overflows at the periphery, is transferred to tray 52 entering at the periphery and overflows weir 56 in the center of the tray 52 where it is transferred to the center of the tray below. The heavier liquid flows on to tray 51 at the outside, overflows weirs 58 at the center, flows on to tray 52 at the center and overflows weirs 58 at the outside of tray 52. Thus the liquids are transferred from tray to tray flowing first from the center to the outside of one tray then from the outside to the center of the tray below. This sequence is repeated for all of the trays in the column.

It is therefore evident that applicant has provided a device in which the following advantages are provided:

Granular, flocculent and substantially non-adhesive solids in suspension in a liquid may be handled in a plate type column. The agitation resulting from the bubbling of the vapor through the liquid on the plate prevents serious accumulation of the solids around the bubble caps. The continuous removal of solids by the improved downtake prevents concentration of solids on the plate to the point where it interferes with vapor or liquid throughput.

Two liquid phases may be handled and the relative volumes of each on the bubble plate controlled by the apparatus of this invention. The improved downtakes of my invention handle the heavy liquid and/or solids while the conventional type downpipes handle the overflowing lighter liquid. The liquid level of the liquid of greater density is dependent upon the total liquid level since the weight of the column of heavy liquid inside the short leg of the downcomer 47 is equal to the weight of the composite or two liquid layers outside the downcomer. The bottom draw downtake of my invention limits the interface level when two liquid phases are present.

Two liquid phases, one carrying a solid phase in suspension may be handled.

A solid or immiscible liquid catalyst, inhibitor, reactant, or the like may be used in the bubble plate column. The solid or heavy liquid is added to the top of the column. For example, in the distillation of butadiene a solid inhibitor such as a copper salt may be fed to the top of the column, passing downward from plate to plate with the liquid.

As previously pointed out downpipes and sealpots for submergence of the downpipe on the plate below are not essential to the invention.

Foaming does not interfere with the operation of the improved downtake.

Vapor entrainment with the downcoming liquid, a serious limitation to the capacity of some downtakes, is eliminated or greatly decreased.

By using both the conventional downpipe and the improved downtake at opposite sides of the bubble plates, countercurrent flow of the two liquid phases across the plate is effected.

Materials for use in the fabrication of the hereing disclosed apparatus need not be special but may be selected from among those commercially available. However, materials should be selected with due consideration to resistance to corrosion, workability, etc.

Although only certain embodiments of my invention have been disclosed for purposes of illustration, it is to be understood that the invention is not thereby limited thereto, but only to be limited in accordance with the following claims when interpreted in view of the prior art.

Having described my invention, I claim:

1. A bubble column for contact of vapors and liquids comprising in combination a vertical shell, vertically spaced substantially horizontal bubble trays extending across said shell, said trays having perforations therein, a bubble cap on each tray operatively connected to one of said perforations, an inverted J tube on each tray having its long leg extending through another of said perforations and sealed to said tray, the short leg of said J tube being disposed over still another of said perforations for agitation of said liquids by said vapors, said J tube being perforated at the bend of the J to prevent syphoning, said still another of said perforations and the short leg of the J tube and said perforations at the bend of the J adapted to conduct vapor from below the tray to the space above the tray, the lower end of the long leg of the J tube that is sealed to said one tray extending below the bend in the J tube sealed to the next lower tray to furnish a seal of said liquids against said vapors.

2. A bubble column for contact of vapors and liquids, and one liquid having solid matter suspended therein, comprising in combination a vertical shell, vertically spaced substantially horizontal bubble trays extending across said shell, and said trays having perforations therein, a bubble cap on each tray operatively connected to one of said perforations, an inverted J tube on each tray having its long leg extending through a second of said perforations and sealed to said tray, the short leg of said J being disposed over a third of said perforations, and said J tube being perforated at the bend of the J, said third perforation and the short leg of the J tube and the perforation at the bend of the J in combination being adapted to conduct vapors from the space below the tray to the vapor space above the tray, said vapors in transit being adapted to prevent settling of said solid matter in the region of said third perforation, and the lower end of the long leg of the J tube that is sealed to the tray extending below the bend in the J tube sealed to the next lower tray to furnish a seal of said liquids against said vapors.

3. A bubble column for contact of vapors, and liquids carrying solids in suspension, comprising in combination a vertical shell, vertically spaced substantially horizontal bubble trays extending across said shell, said trays having perforations therethrough, a bubble cap on each tray operatively connected to one of said perforations, an inverted J tube on each tray having its long leg extending through a second of said perforations and sealed to said tray, and means for lifting said solids in suspension in said liquids into the short leg and around the bend in the J tube, and the lower end of the long leg of the J tube that is sealed to the tray extending below the bend in the J tube sealed to the next lower tray to furnish a seal of said liquids against said vapors.

4. A bubble cap column for contacting two liquid phases and a vapor phase, one liquid phase being heavier than the other liquid phase and carrying solid particles in suspension comprising in combination a vertical shell, vertically spaced substantially horizontal bubble trays extending across said shell, said trays having perforations therein, a bubble cap on each tray operatively connected to one of said perforations, an inverted J tube on each tray having its long leg extending through a second perforation and sealed to said tray, the short leg of said J tube being disposed over and adjacent a third perforation, and said J tube being perforated at the bend of the J to prevent syphoning of liquid to the next lower tray, said third perforation and the short leg of the J tube and the perforation at the bend of the J tube in combination being adapted to conduct vapors from the space below the tray through liquid on the tray to the vapor space above the tray, and said flow of vapors being adapted to prevent settling of said suspended solid particles in the vicinity of said J tube, and the lower end of the long leg of the J tube that is sealed to the tray extending below the bend in the J tube sealed to the next lower tray to furnish a seal of said liquids against said vapors, and a downspout extending through a fourth perforation of the tray, the upper end of said downspout being positioned above the lower end of the long leg of the J tube from the tray above and said upper end of the downspout being intended to define the upper surface of the lighter liquid phase on said tray, and the lower end of said downspout terminating at a point above the open end of the short leg of the J tube of the next lower tray but below the upper end of the downspout of said next lower tray.

5. A bubble cap column for contacting two liquid phases and a vapor phase, one liquid phase being heavier than the other liquid phase, comprising in combination a vertical shell, vertically spaced substantially horizontal bubble trays extending across said shell, said trays having perforations therein and a bubble cap on each tray operatively connected to one of said perforations, an inverted J tube on each tray having its long leg extending through a second perforation and sealed to said tray, the short leg of said J tube terminating at a fixed but small distance above the surface of said tray, the J tube being perforated at the upper part of the bend to prevent syphoning of liquid to the next lower tray, the lower end of the long leg of the J tube that is sealed to the tray extending below the bend in the J tube sealed to the next lower tray to furnish a seal of said liquids against said vapors. and a downspout extending through a third perforation of the tray, the upper end of said downspout being positioned above the end of the short leg of the J tube and above the lower end of the long leg of the J tube from the tray above, said upper end of the downspout being intended to define the upper surface of the lighter liquid phase on said tray, and the lower end of said downspout terminating at a point above the open end of the short leg of the J tube of the next lower tray but below the upper end of the downspout of said next lower tray, said bottom end of one downspout being adjacent the bend of the J tube on the next lower tray, the J tube and the downspout of one tray being substantially diametrically opposed to the J tube and the downspout on the next lower tray.

6. A bubble cap column assembly as in claim 5 wherein the downspout assembly is disposed substantially in the center of one tray and two downspout assemblies are diametrically opposed adjacent the periphery of the next lower tray, the still next lower tray having one centrally disposed downspout assembly; the first mentioned tray having one centrally disposed downspout has two diametrically opposed J tube assemblies, and said next lower tray having two downspout assemblies has one centrally disposed J tube assembly, and said still next lower tray has two diametrically opposed J tube assemblies; each downspout on one tray being substantially directly below a J tube on the next higher tray and directly above a J tube on the next lower tray.

THOMAS H. WHALEY, Jr.

REFERENCES CITED

The following references are of record in the file of this patent:

UNITED STATES PATENTS

| Number | Name | Date |
|---|---|---|
| 1,862,758 | Merley | June 14, 1932 |
| 1,865,024 | Lebo | June 28, 1932 |